United States Patent [19]
Reitman et al.

[11] Patent Number: 5,437,030
[45] Date of Patent: Jul. 25, 1995

[54] SELF-CONFIGURING TEST SYTSTEM

[75] Inventors: William Reitman; Jeanette Kennedy, both of Santa Ana, Calif.

[73] Assignee: Grumman Aerospace Corporation, Bethpage, N.Y.

[21] Appl. No.: 69,690

[22] Filed: May 27, 1993

Related U.S. Application Data

[60] Continuation of Ser. No. 739,483, Aug. 2, 1991, abandoned, which is a division of Ser. No. 607,881, Oct. 31, 1990, Pat. No. 5,175,432.

[51] Int. Cl.$^6$ ............................................. G06F 9/44
[52] U.S. Cl. .......................... 395/650; 364/230.1; 364/230.3; 364/DIG. 1
[58] Field of Search ................. 395/650, 700, 800; 364/230.1, 230.3, 550, 551.01

[56]         References Cited
        U.S. PATENT DOCUMENTS

| | | | |
|---|---|---|---|
| 4,315,315 | 2/1982 | Kossiakoff | 364/516 |
| 4,734,854 | 3/1988 | Afshar | 395/700 |
| 4,748,573 | 5/1988 | Sarandrea et al. | 365/551 |
| 4,809,170 | 2/1989 | Leblang et al. | 395/700 |
| 4,925,311 | 5/1990 | Neches et al. | 395/650 |
| 4,949,290 | 8/1990 | Pike et al. | 364/580 |
| 4,951,192 | 8/1990 | Chase, Jr. et al. | 395/700 |
| 4,974,160 | 11/1990 | Bone et al. | 395/161 |
| 5,036,479 | 7/1991 | Prednis et al. | 364/580 |
| 5,057,996 | 10/1991 | Cutler et al. | 395/650 |
| 5,075,847 | 12/1991 | Fromme | 395/700 |

OTHER PUBLICATIONS

Alfs et. al., "The Karl/Karate System–Automatic Test Pattern Generation on RT Level Descriptions", IEEE Comp. Soc., Sep. 1988, pp. 230–235.

P. F. Pickel, "Automated Development of Test Program Sets for Analog Circuit Modules", IEEE Autotestcon '88 Symp., Oct. 1988, pp. 261–265.

Lewoc et. al., "CADEL: CAD for Real Time Control System Software", IEE Int. Conf. on Software Eng. for Real Time Sys., Sep. 1989, pp. 250–254.

G. Taylor, "UUT and Model Data for Multiple Test-Techniques", IEEE Comp. Soc., Apr. 1989, pp. 229–237.

Narayanan et. al., "A Parallel Algorithm for Fault Simulation on the Connection Machine", IEEE Comp. Soc., Sep. 1988, pp. 89–93.

Malek et. al., "Topological Testing", IEEE Comp. Soc., Aug. 1989, pp. 103–110.

Yates, "METS meets the F-15E Supportability Challenge", Annual Reliability and Maintainability Symp., Jan. 1988, pp. 280–282.

*Primary Examiner*—Kevin A. Kriess
*Assistant Examiner*—Dennis M. Butler
*Attorney, Agent, or Firm*—Stetina Brunda & Buyan

[57]         ABSTRACT

A sensor test system is disclosed for testing the operation of infrared detector modules designed to be placed in earth orbit. The system includes an optical scene test generator (OSTG) for generating a scene representative of the earth's surface as seen from a satellites, and an object moving in relation to the earth's surface. Sensor chamber is disposed adjacent the OSTG for storing a detector module to be tested. Detector module is efficient within the sensor chamber to expose detector elements to the optical scene generated by the OSTG.

6 Claims, 8 Drawing Sheets

SELF-CONFIGURING TEST SYTSTEM

This is a continuation of copending application Ser. No. 07/739,483 filed on Aug. 2, 1991, now abandoned, which is a divisional of U.S. Ser. No. 607,881, filed Oct. 31, 1990, now U.S. Pat. No. 5,175,432.

BACKGROUND OF THE INVENTION

The present invention relates to equipment for testing the operation of sensor modules designed to conduct surveillance of the earth and the surrounding atmosphere from a position in space.

Systems for monitoring activities on the earth and in the surrounding atmosphere have been constructed and deployed in space for many years. Some such systems are designed to map the surface of the earth, others monitor weather conditions and others monitor events relating to national defense. While the accuracy and resolution of such .systems has continually improved over the years certain applications require still greater resolution and real time use of the data. Though precise information regarding the resolution of images returned from orbiting satellites is not publicly available, it is generally known that LANDSAT (U.S.) and SPOT-G (Fr.) satellites provide resolution sufficient to identify objects 15 meters long. More recently, the Soviet Union has offered to sell images from photographic satellites capable of identifying objects as short as 5 meters long. Because certain applications require real time processing of the images of the observed scene, photographic techniques may be inadequate to satisfy the requirements of those applications. Certain applications require that the satellite imagery be done by means of infrared detector systems electrically connected to processing circuitry. The need for high resolution, high speed processing and reliability in the extremes of the space environment has required designers to press detector and processing technology to the existing limits and beyond. Consequently, the costs of constructing such satellite surveillance systems have become enormous as has the cost of launching such a system into orbit. In view of those costs and the uncertainty associated with such advanced technology it is highly desirable to vigorously test the surveillance system component in a space-like environment in order to reduce the potential for failure in orbit.

The present invention is directed to a .technique and system useful to simulate the space environment in which detector modules are deployed, and to simulate the types of images which they are intended to detect and track. The invention is useful to generate various test scenarios and measures the detector module response to each scenario. The response of the module to the various scenarios may then be evaluated to determine the operability of the various detector module components. The test information may be used to replace inoperative detector module components, to facilitate the design of new modules and related support electronics, or to develop methods of processing and prioritizing detection and communication functions associated with the module.

SUMMARY OF THE INVENTION

A sensor test system is disclosed for testing the operation of infrared detector modules designed to be placed in earth orbit. The system includes an optical scene test generator (OSTG) for generating a scene representative of the earth's surface as seen from a satellite, and an object moving in relation to the earth's surface. Sensor chamber is disposed adjacent the OSTG for storing a detector module to be tested. Detector module is efficient within the sensor chamber to expose detector elements to the optical scene generated by the OSTG.

The system incorporates means for simulating a space environment within the OSTG by regulating vacuum temperature conditions therein.

The OSTG is operative to generate an infrared frequency image of the earth's surface, and an object moving in relation to the earth's surface. Various servo mechanisms are incorporated within the OSTG to simulate various types of relative movement, such as missile trajectory, satellite drift, and satellite jitter. The intensity and spectral content of the infrared images may also be selectively varied to simulate a variety of different testing conditions, each representative of different operating scenarios.

In the presently preferred embodiment separately generated optical images, representative of a moving target and a background scene, are combined at an optical image combiner and optically directed towards infrared detector elements disposed on the module to be tested. The combined image may thereafter be selectively toggled between different locations from the surface of the detector module. Such toggling is effective to permit selective interrogation of different infrared detector elements formed on the surface of the detector module.

A processing technique is also disclosed for configuring a set of instructions to perform desired processing functions, such as those functions useful to regulate the operation of the sensor test system. As described below the "defined processing functions" refer to the compilation and extraction of information from input data without respect to the manner in which the computer instructions are sequenced or used. However, it is to be understood that the processing technique has application beyond the operation of the sensor test system disclosed herein.

The process is self configuring and permits real time processing of data by variably configuring libraries of general function modules. In accordance with the process a library of general function- modules are provided in predetermined priority levels. Those modules are selectively linked only as necessary to implement the desired processing functions. This data is provided to the linked functional modules to facilitate implementation of the desired processing functions by the linked modules. Outputs are then communicated from the linked functional modules only to selected data presentation devices.

DETAILED DESCRIPTION OF THE PRESENTLY PREFERRED EMBODIMENT

The detailed description set forth below is intended merely as a description of the presently preferred embodiment of the invention, and is not intended to represent the only form in which the present invention may be constructed or utilized. The description below sets forth the functions in sequence of signals that are affected by the invention in connection with the illustrated embodiment. It is to be understood, however, that the same, or equivalent functions where signal sequences may be accomplished by different embodiments that are also intended to be encompassed within the spirit and scope of the invention.

Figure 1:
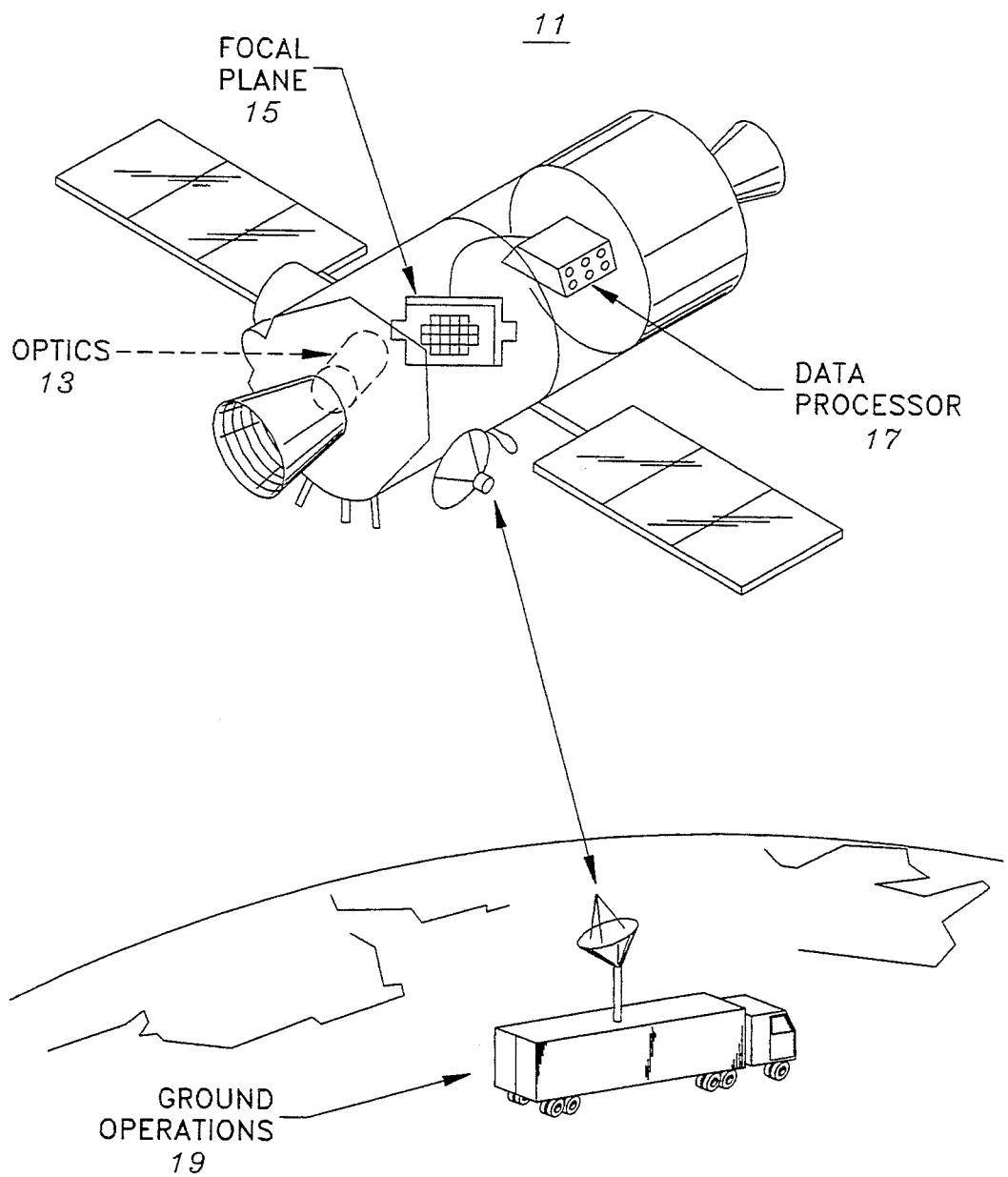
FIG. 1 is a perspective view of an exemplary satellite generally illustrating its various components.

FIG. 1 of the drawings generally illustrates an infrared detector system payload disposed within an orbiting satellite system. The satellite system generally incorporates an optical system which focuses objects within the field of view on the surface of a detector focal plane. The focal plane is formed of electro optical components adapted to detect objects within the field of view and to generate electrical signals responsive to images of those objects. By analyzing the pattern of information produced by the individual detector elements and correlating that information over time in various ways a detailed image of the area within the field of view can be generated. The precise satellite structure, the structure of the detector modules used to form the detector focal plane, and the precise manner in which the information from the detector elements is processed is not intended to be a limitation with respect to the present invention, which, in its broader aspects, has application to all types of satellite and detector systems. Thus, the reference to particular types of detector modules and electronic systems compatible with those detector modules is intended as exemplary of one manner in which the present invention may be utilized. Reference is made to the following patents which are representative of the present state of the art in relation to the construction of infrared detection systems and related support electronics having application to space surveillance systems.

U.S. Pat. No. 3,582,714 CARSON ET AL.
U.S. Pat. No. 3,970,990 CARSON ET AL.
U.S. Pat. No. 4,283,755 TRACY
U.S. Pat. No. 4,304,624 CARSON ET AL.
U.S. Pat. No. 4,352,715 CARSON ET AL.
U.S. Pat. No. 4,354,107 CARSON ET AL.
U.S. Pat. No. 4,103,238 CLARK
U.S. Pat. No. 4,525,921 CARSON ET AL.
U.S. Pat. No. 4,551,629 CARSON ET AL.
U.S. Pat. No. 4,592,029 ALTMAN ET AL.
U.S. Pat. No. 4,618,763 SCHMITZ
U.S. Pat. No. 4,646,128 CARSON ET AL.
U.S. Pat. No. 4,659,931 SCHMITZ
U.S. Pat. No. 4,675,532 CARSON
U.S. Pat. No. 4,672,937 CARSON ET AL.

The teachings of the above cited references are incorporated herein by reference.

FIG. 1 generally illustrates a satellite 11 shown in Earth orbit. The portions of satellite 11 of particular interest include an optical system 13, detector focal plane and data processor 17. The optics 13 function to image objects within the satellite field of view on the surface of focal plane 15. Optics 13 may include scanning mechanisms and/or staring mechanisms, depending on the particular function of the satellite 11. The optics 13 may include various enhancements, such as means for reducing the effects of radiation from the sun, means for filtering the light frequencies passing through the optical system, and means for toggling the location of the image on the surface of focal plane 15 in order to derive certain information from the image.

As described in more detail below, the focal plane 15 may be any of a variety of constructions, utilizing a variety of different materials suitable to operate in a space environment. The focal plane 15 functions to derive electrical signals from the image focused by optical system 13 and to communicate such electrical signals to the data processor 17. Processor 17 directs interrogation of the focal plane 15 and is controlled by signals from ground operations 19.

Figure 2:
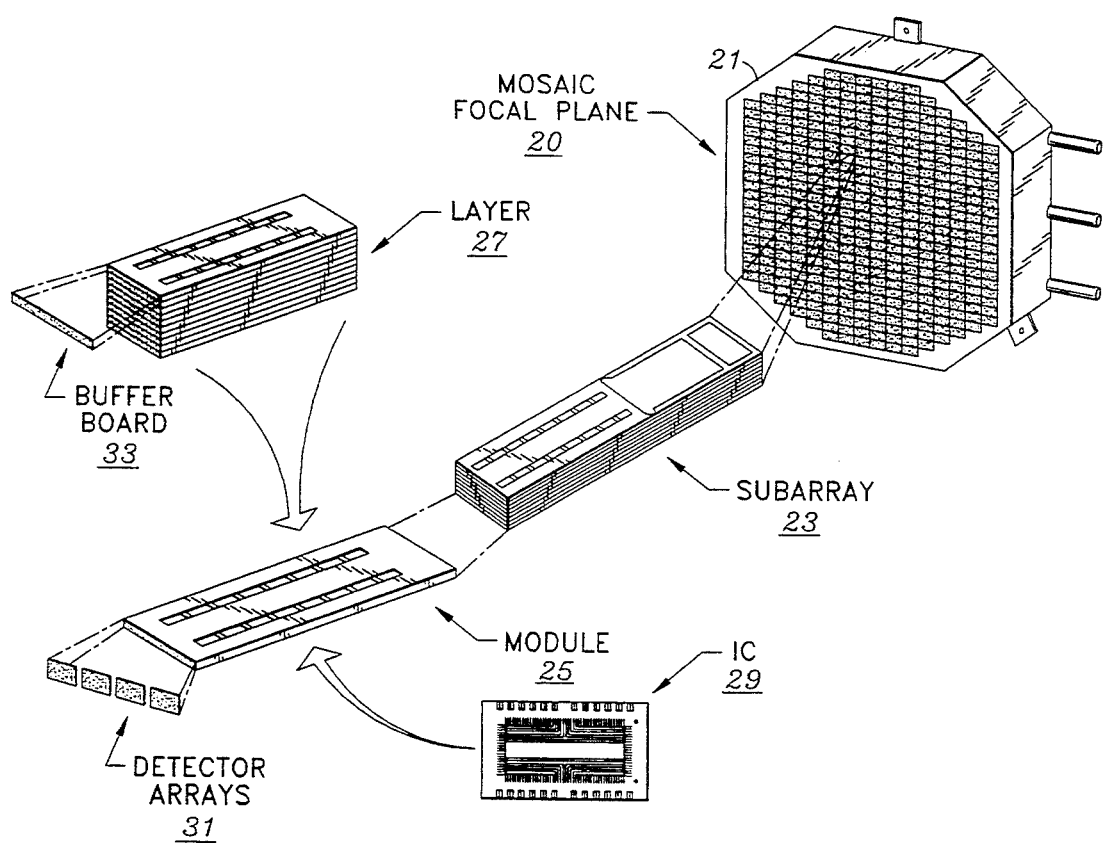
FIG. 2 is a perspective view of an exemplary detector focal plane incorporated in the satellite illustrated at FIG. 1, with portions enlarged;.

Referring to FIG. 2 an exemplary focal plane useful in the application illustrated at FIG. 1 is shown in more detail. As shown at FIG. 2 the focal plane 20 is defined by a housing 21 which holds a substantial number of individual subarrays 23 disposed to have edge portions that collectively form the front face of detector focal plane 20. Each subarray 23 is comprised of a plurality of modules 25, with each module is comprised of a plurality of separate layers 27. Integrated circuits 29 may be mounted on the layers 27 to facilitate on-focal-plane processing of data and .interrogation of detector elements. Detector arrays 31, leach containing a plurality of detector elements are formed along a vertical edge surface of the modules and are in electrical communication with the integrated circuits via conductive paths formed on the surface of the layers 27. A buffer board may be disposed intermediate the front face of module 25 and the detector arrays 31 to facilitate interconnection and to isolate the detector arrays from mechanical stress generated by expansion or contraction of the module 25. Further details describing the construction of such exemplary modules are set forth in the above cited U.S. Patents. Exemplary integrated circuits suitable for incorporation with the modules include circuits disclosed in the following mask work registrations, the substance of which is incorporated herein by reference:

MW 3147 CUSTOM INTEGRATED CIRCUIT LAYOUT FOR DETECTOR CIRCUIT INCLUDING GAIN NORMALIZATION AND ANALOG TO DIGITAL CONVERTER
MW 3145 CUSTOM INTEGRATED CIRCUIT LAYOUT FOR MULTIPLEXER
MW 3148 CUSTOM INTEGRATED CIRCUIT LAYOUT FOR LINEAR AMPLIFIER
MW 3146 CUSTOM INTEGRATED CIRCUIT LAYOUT INCLUDING CHOPPER STABILIZED AMPLIFIER
MW 3150 CUSTOM INTEGRATED CIRCUIT SCANNING CIRCUIT
MW 3144 CUSTOM INTEGRATED CIRCUIT LAYOUT FOR DETECTOR CIRCUIT INCLUDING MODIFIED BANDPATHS AND GAIN CHARACTERISTICS
MW 3151 CUSTOM INTEGRATED CIRCUIT LAYOUT FOR SIGNAL PROCESSOR
MW 3149 CUSTOM INTEGRATED CIRCUIT LAYOUT

-continued

FOR STARING CIRCUIT

Figure 3:
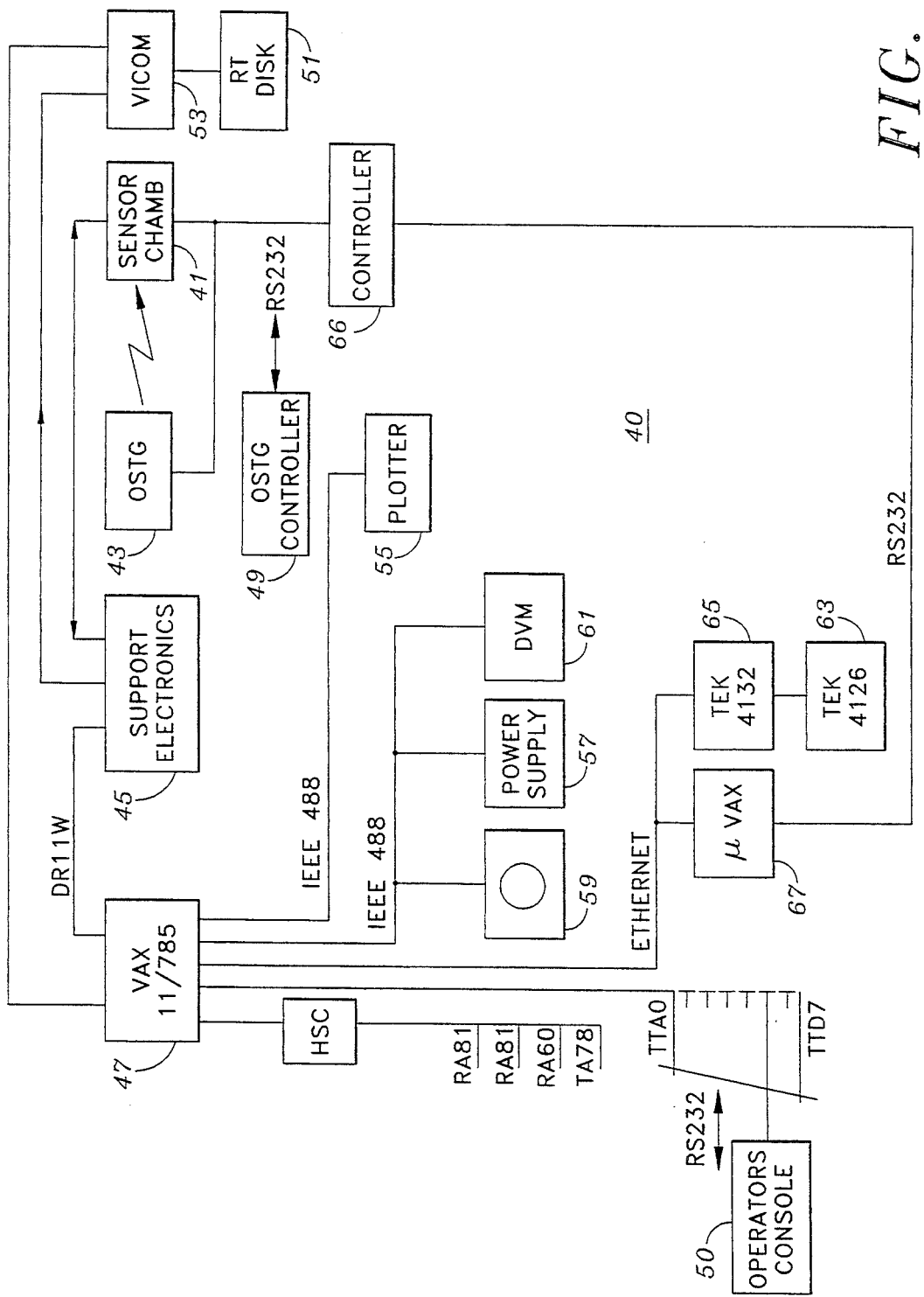
FIG. 3 is a block diagram illustrating the basic configuration of a sensor test system for testing detector modules such as those illustrated at FIG. 2.

FIG. 3 illustrates the basic block diagram of the system for testing the operation of the modules 25. The principal elements of the system 40 include the sensor chamber 41, adapted to hold a module 25 to be ,tested, the optical scene test generator 43 (OSTG), adapted to generate the optical image for display to the module, and the support electronics 45 adapted to operate and gather data from the subarray 23 or module 25. A VAX 11/785 computer 47 regulates the operation of the support electronics. The computer 47 operates under the direction of control programs and in accordance with instructions entered into controller 49, which may be a personal computer such as an IBM TM personal computer. Detailed programming information for an exemplary program to enable the functions of controller 49 are disclosed in an unpublished appendix submitted herewith.

Pursuant to the instructions resident in controller 49 the VAX computer 47 functions to regulate operations in the OSTG 43 and sensor chamber 41, as well as to establish the state of support electronics 45 and establish communications paths to output and store test information from the sensor chamber 41. As described more fully below the sensor chamber 41 and OSTG 43 include servo mechanisms adapted to regulate the position of elements therein. The sensor chamber 41 includes servo mechanisms to orient a detector module to simulate the various angles at which the module may be disposed in relation to the Earth's surface. The OSTG 43 includes several servos to simulate, for example, movement of the Earth scene, movement of a target in motion in relation to the Earth scene, drift and jitter, representative of relative movement between the satellite and Earth scene and toggling of the imagery across the module detector array surface. Depending upon the particular test scenario defined by controller 49, the VAX computer 47 orients the various servo mechanisms and regulates the vacuum pumps and infrared sources to provide scenes and orientations representative of the desired test environment.

Referring again to FIG. 3, it is to be understood that the particular orientation of visual displays and recording and analyzing devices is intended to be exemplary of but one embodiment of the invention and is not intended to be limiting of other embodiments wherein the same or similar regulation or recording functions are implemented in a different manner. In the illustrated embodiment, data management is accomplished by the DR11W connector between the VAX computer 47 and support electronics 45. IEEE 488 connectors communicate formatted data from the VAX computer 47 to plotter 55. Information stored on the real time disk is available for display on VICOM 53 under the control of VAX 47. Plotter 55 provides another means for graphically illustrating the data communicated to VAX 47. Another IEEE 488 connector is used to communicate signals between the VAX computer 47 and power supply 57. Oscilloscope 59 and digital volt meter 61 are used to monitor the signals communicated along this conductor as well.

The graphics engine 63, implemented as a TEK 4126, provides real time display of high resolution images of test conditions. Graphics engine 63 operates in conjunction with controller 65, which may be implemented as a TEK 4132 or 4301. Microvax 67 is also connected to the ethernet and serves to provide processing of the test conditions and illustrating the environmental data such as vacuum, temperature or servo position data.

Pursuant to the program architecture and instruction list described more fully below, VAX computer 47 also communicates with controller 49 via an RS232 conductor, shown to include lines TTA0 . . . TTD7. In the present embodiment not all lines of the RS232 connectors are utilized and it should be understood that different display requirements or system components may necessitate the communication of different signals or signal formats along portions of the RS232 connector. However, in the presently preferred embodiment lines TTA0–TTA3 are directed to a display terminal to display information regarding vacuum, vacuum pressure, temperature and other environmental conditions within the sensor chamber 41 or OSTG 43. Line TTA4 is directed to an external printer to print out error messages as may be generated by the VAX computer 47. Lines TTB0–TTB3 communicate signals to a low or medium resolution graphic display device to facilitate real time functions such as illustration of histograms representative of the test data. Line TTB5 communicates signals between the VAX computer 47 and a test operator's console. In the presently preferred embodiment the test operator's console, i.e. controller 50, is implemented as a Macintosh TM computer manufactured by Apple Computers, Inc. The console functions to make the system "user friendly" by translating operator instructions to a data format compatible with the VAX computer 47, thereby avoiding the need for direct input of signals to the VAX computer 47 in a format that may be more complicated for the operator. The "C" lines, e.g. TTC0/TTC4 may be used to provide communication between VAX 47 and remote controllers, such as other IBM TM personal computers located in a test lab. The "C" lines may also be used to facilitate expansion, calibration inside the chambers, temperature regulation, etc.

It should be understood that various control circuits can be used to regulate the operation of the sensor chamber and OSTG and to display and store the test conditions and responsive data. Accordingly, the above description is intended to be exemplary and not limiting with respect to other control circuits that may be utilized to implement the functions of the present invention. A further description of the construction of sensor chamber 41 and OSTG 43 is provided below.

The OSTG 43 is designed to facilitate the presentation of different test scenarios to the detector module. As described in more detail below the OSTG includes means for generating infrared images representative of the surface of the earth and of one or more objects moving in relation to the surface of the earth. As is well known in the art such infrared images can be presented using a variety of different means. The present invention uses a transmissive scene similar to a halftone image which regulates the amount of infrared radiation passed through from an IR source per unit area by the size and arrangement of opaque spots on the scene plate. The scene plate and target plate may be formed from a circular dish of silicon.

Imagery of one or more objects moving along the earth's surface, or in the atmosphere or space adjacent the earth, is also achieved by radiating the template with an infrared light source. By varying the position of the template the system can simulate movement of an object under investigation with respect to the earth. The intensity and shape of the light may be varied to simulate different types of vehicles, e.g. solid or liquid fueled missiles. The size of aperture formed in the template may also be varied in size and shape *to represent objects of different sizes and shapes under investigation, e.g. planes, missiles, ships, etc.

By independently regulating the infrared source, movement of the target template and the relative position of servos 79, 101, 107, 117, 123 (FIG. 4) the system can simulate relative movement between the earth, the satellite, and the object under investigation. Different types of relative position or movements can be simulated in multiple ways. For example, movement of the earth with respect to the detector module may be simulated by either moving the background template 99 or the detector module 25. Other types of relative movement may similarly be affected in different ways as will be apparent to those having ordinary skill in the art in view of the present disclosure. Different templates and apertures may be used to produce different test scenarios which are then regulated by program control.

Figures 4, 4A:
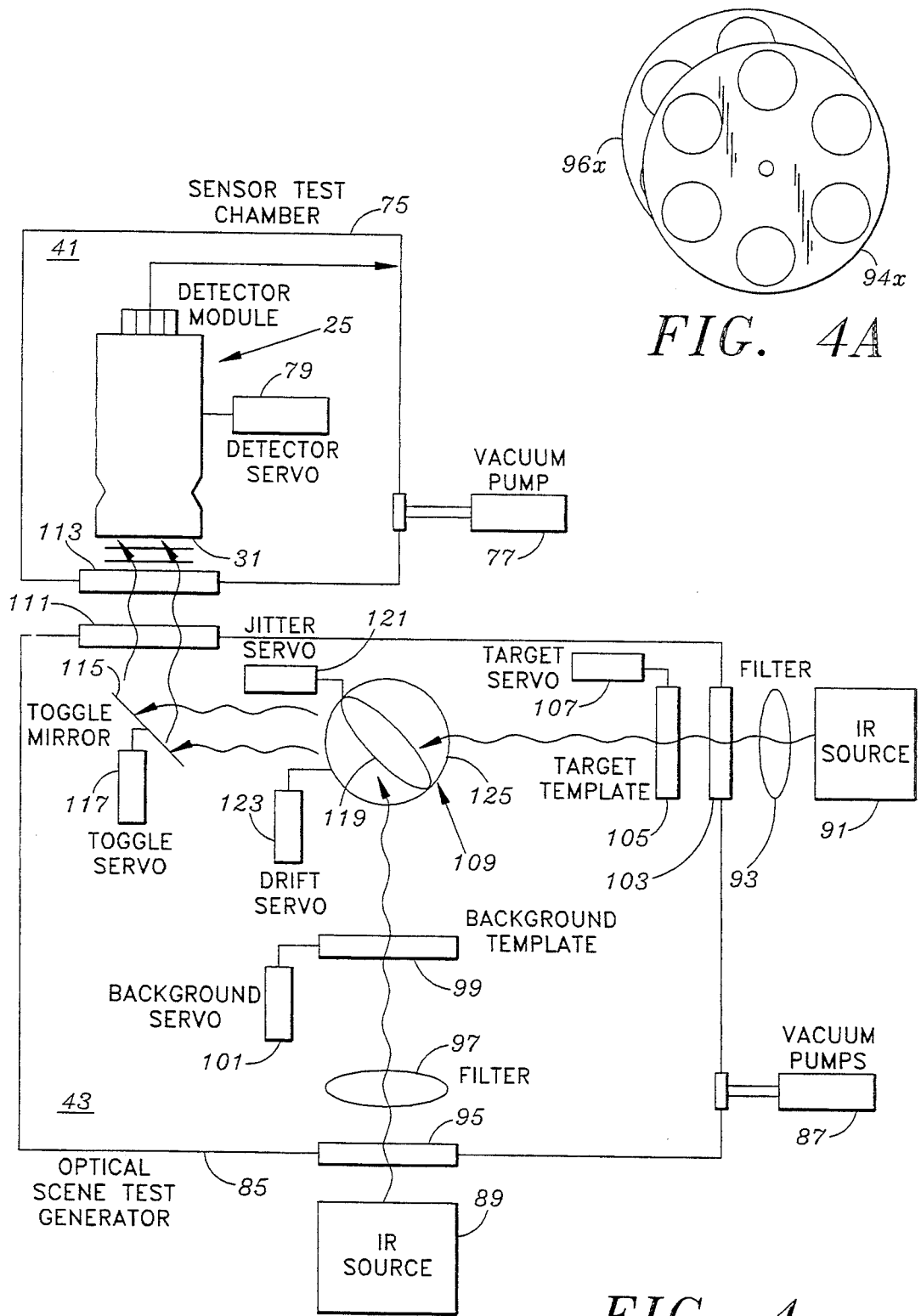
FIG. 4 is a top view of the sensor chamber and the OSTG illustrating the principal mechanical components thereof.
FIG. 4a is a perspective view of optical filters 94, 96, shown generally at FIG. 4.

Referring to FIG. 4, a top view of the construction of the sensor chamber 41 and OSTG 43 is provided. Sensor chamber 41 is a thermal vacuum chamber comprising housing 75 which is evacuated by means of vacuum pump 77. In practice the vacuum pump 77 may be a high speed vacuum control pump such as that sold by CTI-Cryogenics, model CT-10, and is operative to draw vacuum to a level of 1 time $10^{-6}$ atmos at temperatures between 88°–145° K. Chambers 43, 41 may be cooled to space temperatures using liquid nitrogen from an external source. In the presently preferred embodiment internal heaters are connected to the dewars to stabilize each dewar at the test operating temperature. Detector module 25 is mounted within the sensor chamber 41 so as to be movable in three axes, x, y and z, pursuant to actuation of detector motion servos, collectively represented by servo 79. The servo 79 is operative to position the detector module so as to image the test scene on the surface of the detector arrays 31 and to orient the detector module 25 at a desired angle of inclination with respect to the test scene, simulating an angle of inclination of the satellite with respect to the Earth's surface. Servo 79 is connected to the VAX computer 47 via the controller 66 and γVAX 67. (See FIG. 3) Detector module 25 is in electrical communication with support electronics 45 to facilitate selective interrogation of detector elements within detector arrays 31 and to communicate detector element outputs in response to such interrogation. In the presently preferred embodiment both sensor chamber 41 and OSTG 43 are mounted on a granite testbed that is isolated from the ground by hydraulic suspension means. This permits the sensor chamber 41 and OSTG 43 to be isolated from vibrations in the ground or surrounding building which would introduce distortion to the test results. As previously described certain initial processing of the detector signals may be accomplished within integrated circuits 29 (see FIG. 2) disposed directly on the module's surface. More complex processing of the output of detector module 25 is affected by the VAX computer 47 which also correlates the module output'signal with test scenario data. A listing of instructions resident in the VAX computer 47 is submitted herewith. Other functions, such as bias regulation, clock signals, sampling and multiplexing of data may be affected by the support electronics 45.

FIG. 4 further shows a top view of the layout of the OSTG 43. OSTG 43 includes housing 85 disposed adjacent 'sensor chamber housing 75. Housing 85 is evacuated by vacuum pumps 87 which may be constructed similar to vacuum pumps 77 that evacuate the sensor chamber 41. In the preferred embodiment two infrared light frequency sources,89 and 91 are disposed exterior to the OSTG 43 and directed to transmit infrared light towards optical systems disposed within housing 85. IR sources 89 and 91 may alternatively be disposed within housing 85 as may be permitted by the available space within housing 85. One advantage of disposing the IR sources outside of housing 85 is that optical filters, such as optical filter 93, may be replaced without the need to bring the OSTG to normal atmosphere conditions. Filters, such as filter 93, may be useful to vary the intensity or to filter a portion of the-IR frequency spectrum to test the detector module responsiveness to selected frequencies within the IR frequency range. As is well known to those of ordinary skill in the art certain frequencies ranges within the IR range are indicative of different objects or backgrounds. For example, certain portions of the IR frequency range are more representative of a solid rocket booster burn whereas other portions of the IR frequency range may be representative of a liquid rocket booster burn. By selectively filtering the light entering the OSTG the detector module may therefore be selectively tested for detection of certain types of vehicles.

In the preferred embodiment IR source 89 is intended to be useful to generate a scene representative of the Earth and other background conditions, e.g. objects on the earth's surface or cloud cover, whereas the IR source 91 is useful to generate an image representative of an object moving in relation to the background. The IK sources 89 and 91 may be implemented using an infrared light source, such as the model WS161-55, sold by Electro-Optical Industries.

The IR frequency light from IR source 89 enters housing 85 through window 95. IR source 89 is set to the desired spectral temperature. IR source 91 is also set to the desired spectral temperature. Filters 93, 97 may be implemented as gradient filters which may be rotated to a desired density filter to regulate light from IR source 91 entering housing 85. It is anticipated that spectral filters may also be used selectively filter the spectral content of the IK light entering the OST 643. A combination of spectral and neutral density filters are utilized in the sensor test chamber 41, as described in connection with FIG. 4A. Referring to FIG. 4, light from IR source 89 passes through filter 97 and impacts on background template 99. Background template 99 may be changed in order to conduct test scenarios wherein different portions of the earth's surface are intended to serve as background for the test. Background template 99 is typically provided with a series of small apertures which, upon the passage of IR light from IR source 89, generates an infrared signature similar to that observed from satellites looking at particular portions of the Earth's surface. Background template 99 may be changed in order to conduct test scenarios wherein different portions of the Earth's surface are intended to serve as background for the test. Background servo 101 facilitates movement of the background template 99 to facilitate simulation of movement of the background in relation to the detector module 25 and/or the target.

As previously noted IR source 91 is useful to generate an infrared signal used to simulate a target. The IR frequency signal passes through optical filter 93. The signal from filter 93 passes into housing 85 through window 103 and impacts target template or membrane 105. Target template 105 is provided with one or more apertures of selected sizes intended to produce the characteristic infrared signature of one or more particular types of vehicles or other objects. By varying the intensity of the signal from IR source 91, and the size of the aperture within target template 105, various types of vehicles or other objects can be simulated. Target servo 107 functions to move the target template 105 to simulate movement of the target in relation to the background and/or the detector module. As with background servo 101, target servo 107 may in practice be formed of a plurality of servos adopted to facilitate three-axis movement of target template 105. By selective actuation of target servo 107 various types of trajectories and speeds can be simulated such that the characteristic flight paths of different types of vehicles can be simulated. For example, cruise missiles or submarine launched ballistic missiles may travel trajectories that are different than the trajectories of ground based intercontinental ballistic missiles. In order to test the responsiveness of the detector module through different types of vehicles the target template may be changed and/or the action of target servo 107 can be varied in accordance with the test program implemented in controller 49 (see FIG. 3).

It should be understood that more than one template may be used to implement the functions of target template 105. In the embodiment illustrated at FIG. 4 a single target template is utilized and, therefore, each target image produced by the template would move in a common manner. However, if more than one target template was used it is possible to simulate a plurality of targets moving relative to each other. It is also anticipated that in alternate embodiments a dynamic IR scene and multiple IR targets may be imaged directly off a cathode ray tube onto the focal plane.

The images generated by the IR light passing through background template 99 and target template 105 are directed to optical image combining device (beam splitter) 109. Device 109 functions to receive both optical images and to direct them in such a manner that they ultimately pass out of housing 85 through window 111, into housing 75 through window 113, filters 94, 96 and impact on the detector arrays 31 disposed on the front surface of detector module 25. In the presently preferred embodiment device 109 communicates the images from templates 99 and 105 to toggle mirror 115 whereupon the images are reflected to detector module 25.

FIG. 4a illustrates in more detail the construction of filter wheels 94, 96, disposed within the sensor test chamber 41. Filter wheel 94 may be implemented as a neutral density wheel, rotatable to present different density gradient filters. Filter 96 may be implemented as a spectral wheel, rotatable to present different spectral density filters. By rotating the spectral filter wheel 96 the infrared frequency of the light signal presented to the detector module 25 may be selectively varied. As will be apparent to one of ordinary skill in the art the selective rotation of filter wheels 94 and 96 will enable the testing of the detector module 25 under a variety of different conditions.

Toggle mirror 115 is an optional element in the sensor test system which is utilized dependent upon the construction of detector module 25. In some constructions detector module 25 may be formed such that adjacent lines of detector elements forming the detector arrays 31 are constructed or connected to be responsive to different portions of the IR frequency spectrum. Thus, by toggling the image such that the same image portion is moved from one line of detectors to the adjacent line of detector elements (or to any other line of detector elements) information particular to a portion of the frequency spectrum may be extracted from the test image without the need for increasing population of detector elements within the detector array.

As described in more detail in connection with FIG. 5, image combining device 109 includes lens 119 which is connected to jitter servo 121 which will selectively move the lens 119 in a manner to represent satellite jitter. The jitter servo 121 moves the target in background with respect to the detector module in such a manner to simulate vibration of the satellite. Drift servo 123 is connected to turntable 125 which also supports the lens 119. Drift servo 123 moves the mirror support 125 in such a fashion as to provide slow rate movement of the target and background in a manner to simulate drift of the satellite as it orbits the Earth. As will be clear to those of ordinary skill in the art the relative operation of the various servos 101, 107, 117, 121 and 123 is performed under program control in response to the particular test scenario implemented by controller 49.

Figure 5:
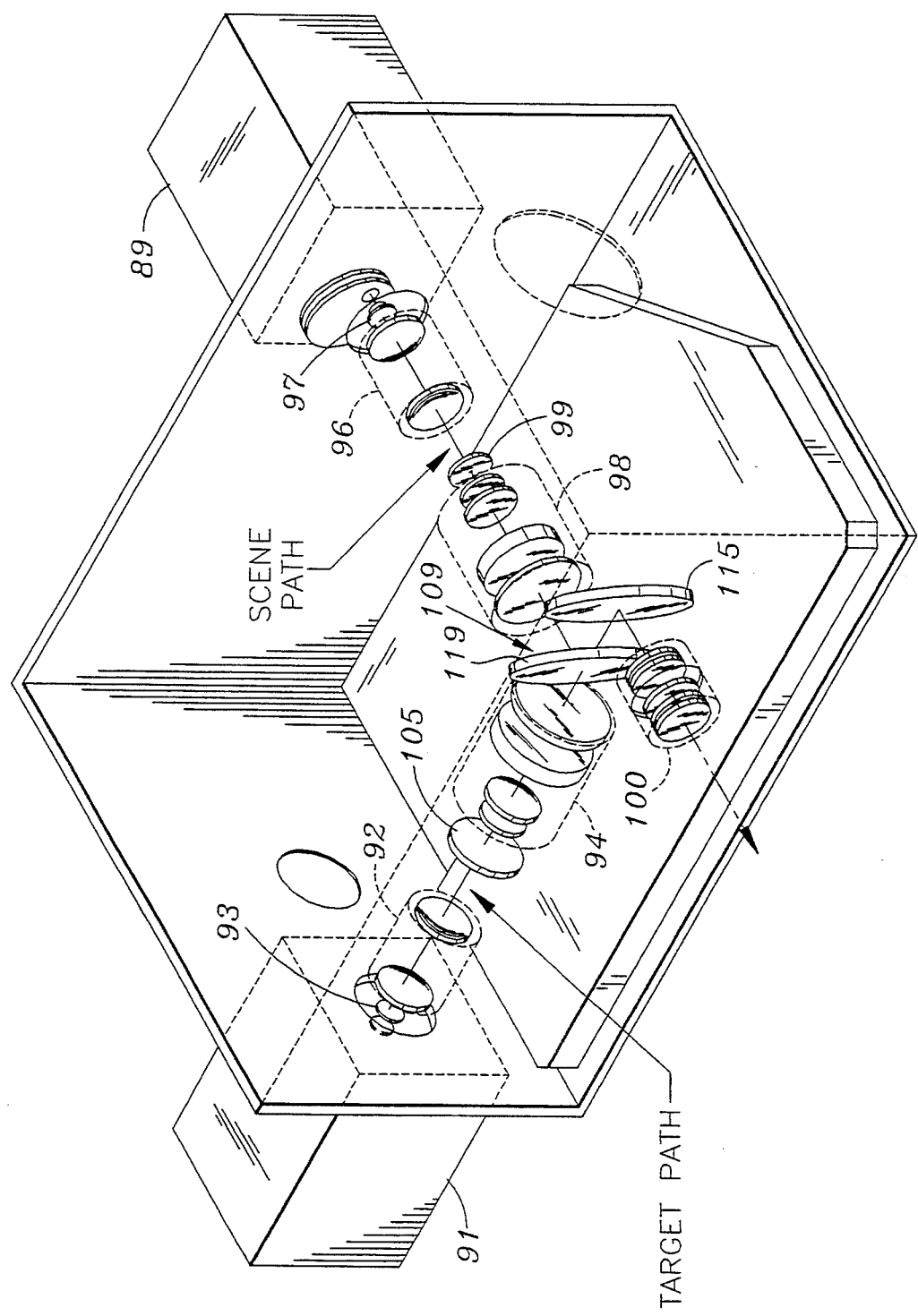
FIG. 5 is a perspective view of the construction of the OSTG illustrated at FIG. 4.

FIG. 5 is a perspective view of the OSTG illustrated at FIG. 4. The construction shown at FIG. 5 generally illustrates the optical arrangement implemented within the OSTG for combining the scene and target images, and for permitting relative movement therebetween. The target path is initiated with IR source 91 and passes through filter 93, condenser lens assembly 92, target mask 105, target collimator 94, and lens 119 of the beam splitter 109.

The scene path commences with IR source 89 and passes through filter 97, scene condenser lens assembly 96, scene template 99, scene collimator 98, and then impacts lens 119 of beam splitter 109.

The beam splitter 109 functions to combine the reflected scene images and transmitted target image on the surface of toggle mirror 115. The combined image is then communicated to the detector module through exit lens assembly 100.

Figure 6:
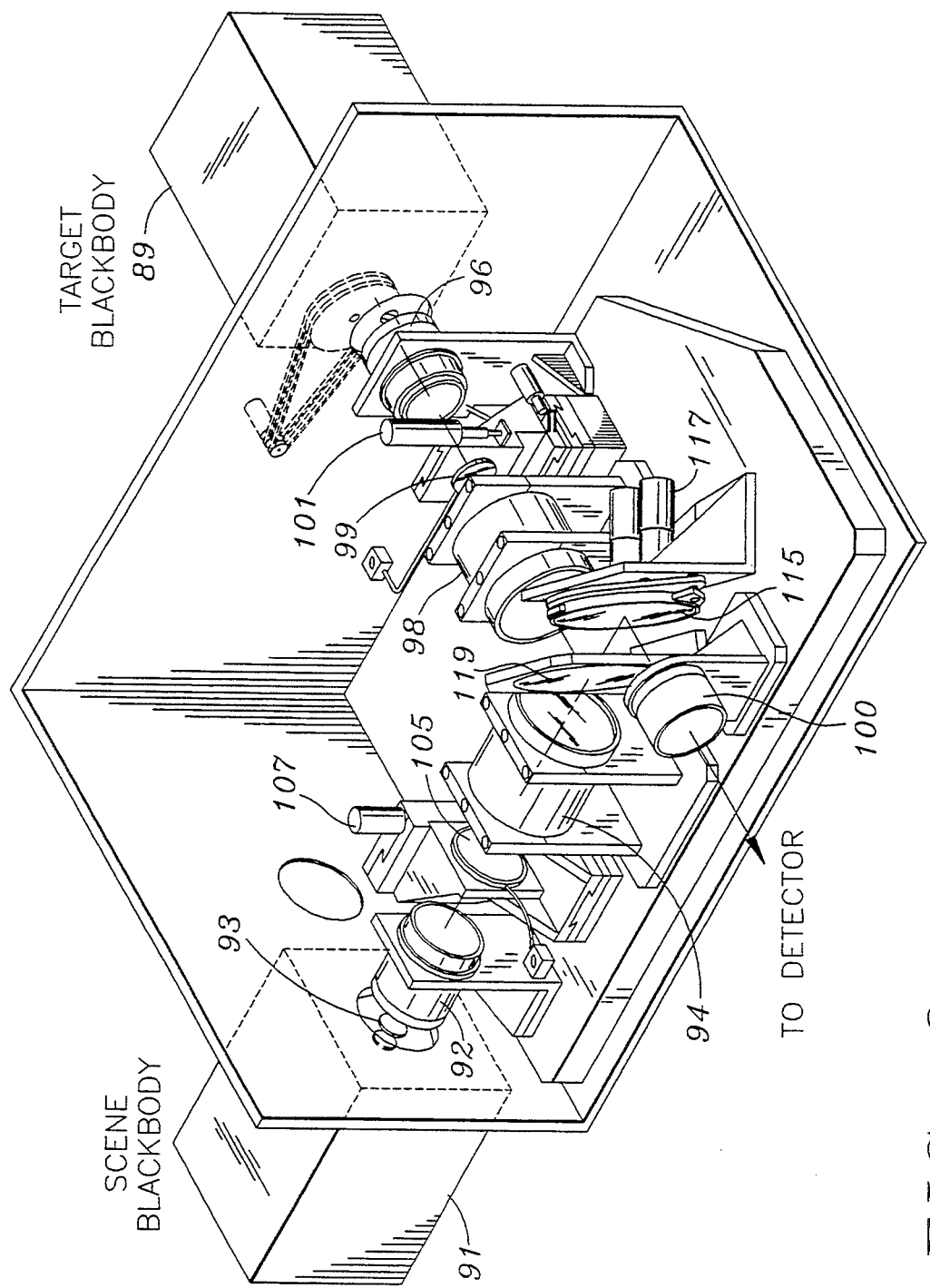
FIG. 6 is a further perspective view of the OSTG illustrated at FIG. 4.

FIG. 6 generally repeats the optical structure shown at FIG. 5 with the further inclusion of the mechanical supports and servos which regulate movement of the target and scene images. FIG. 6 illustrates the target servo 107 used to control movement of the scene mask 105. Background servo 101 operates to regulate the movement of the background mask 99. Both the background and target servos permit regulation of high resolution movement in the X, Y and Z planes. Toggle servo 117 regulates the movement of toggle mirror 115 as more fully set forth in connection with FIG. 7.

As will be recognized by one of ordinary skill in the art the particular optical assembly utilized to generate and vary the position of the target and scene images may be varied in accordance with the particular design requirements and test scenario to be implemented. Accordingly, the particular function set forth in connection with FIGS. 5 and 6 is intended to be only exemplary of the presently preferred embodiment of the invention.

Figure 7:
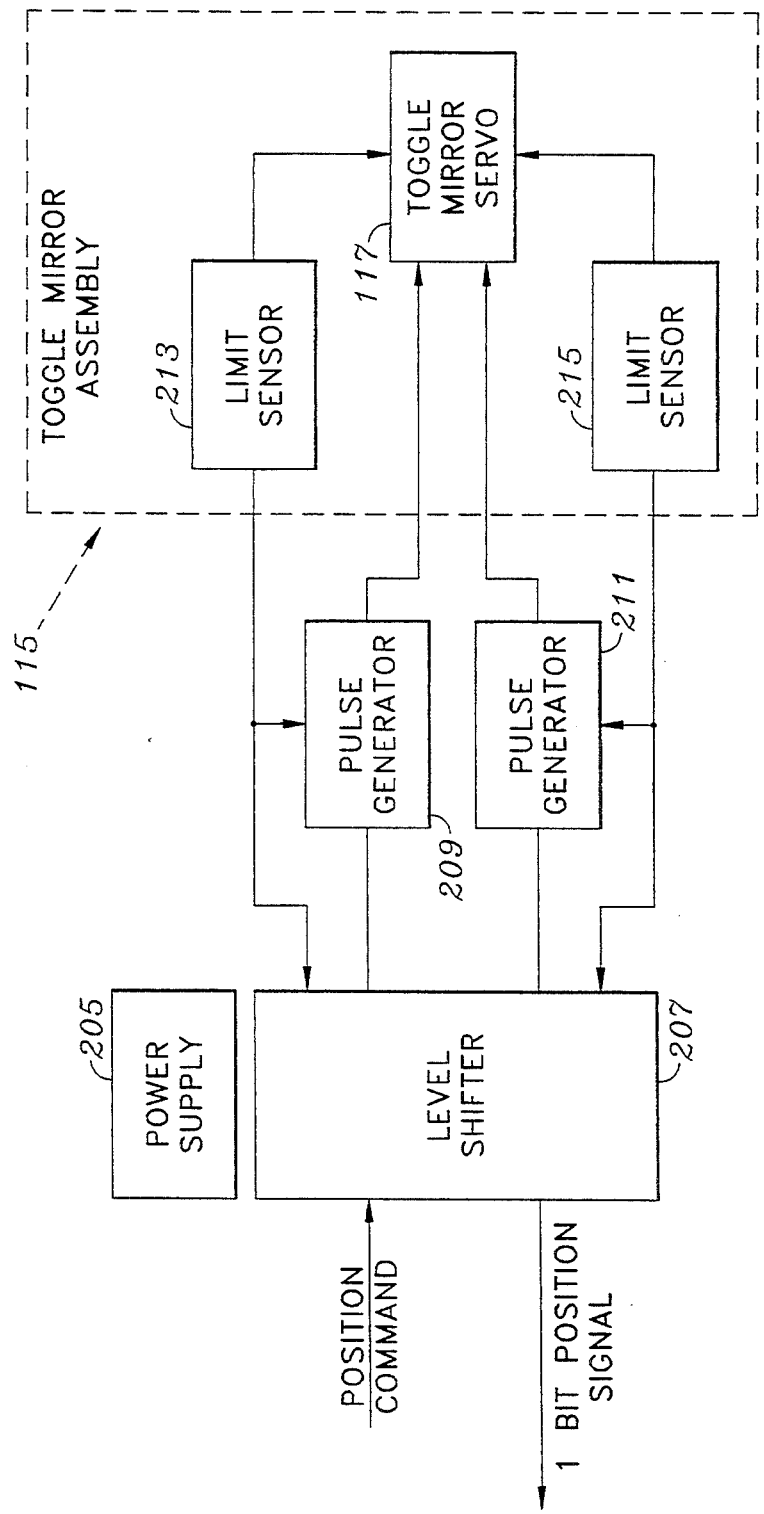
FIG. 7 is a functional block diagram of the control circuitry to operate the toggle servo 117.

FIG. 7 is a functional block diagram illustrating the electrical control circuitry to operate mirror toggle servo 117. The circuit set forth at FIG. 7 generally demonstrates the manner in which servo 117 is operated to regulate the motion of toggle mirror 115., The toggle mirror assembly 115 is moved between two positions in response to the motion of toggle mirror servo 117. Upon receipt of signals from level shifter 207 the toggle mirror servo 117 moves the toggle mirror in alternate directions. Unit sensors 213, 215 act to terminate any further movement by the toggle mirror servo 117 beyond designated limits. Power to level shifter 207 is provided by power supply 205. The level shifter 207 enables pulse generators 209, 211 which in turn generate a one-bit position signals that activate toggle mirror servo 117 to move in the desired direction.

Figure 8:
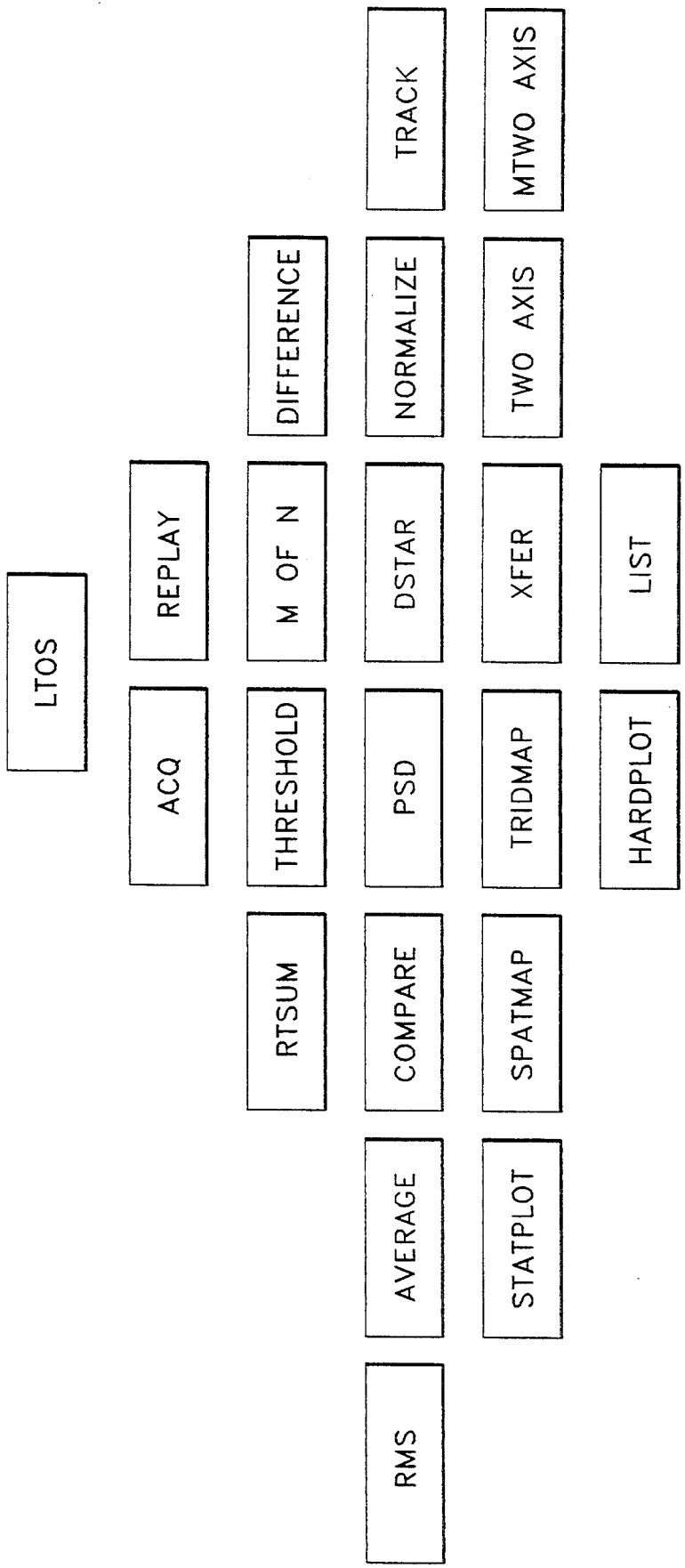
FIG. 8 is a block diagram illustrating the priority levels established by the programming within the controller 49.

FIG. 8 is a block diagram listing the priorities of operation of the software resident in the VAX 11/785 computer to operate the function of the sensor test system. As shown at FIG. 8, the level 1 program module refers to the laboratory test operating system (LTOS), i.e. the root program or test system which operates to specify the ,type of tests and terminals to be used in the particular test scenario to be run. Functionally, the LTOS program interactively defines a test requirement, loads all required tasks, allocates all shared buffers, links all required lower level functional modules, monitors the status of all tasks and waits for operator input after successful completion of all tasks. Further details of the LTOS and other level systems are set forth below, with a detailed instruction list being attached hereto as an unpublished appendix.

Priority level 2 is assigned for the task of data acquisition and data replay. The .level 2 module receive requirements from the LTOS program and shares buffers with other level modules. The module loads raw data from the support electronics into associated buffers and, in response to LTOS signals the module transfers the information contained in the current buffer onto a storage disk during acquisition and sets a done flag for the LTOS after the acquisition is complete. The module checks for operation of level 3 tasks and triggers the operation of level 3 tasks.

The level 2 program module includes an acquisition (Acq) module which acquires data from the support electronics 45 and controls level 3 procedures via event flags. If level 3 procedures fall behind the data module stores the raw data during acquisition. The level 2 module also includes a replay module which replays data from a previously loaded disk data file. The replay module is activated either from the LTOS (playback) or acquisition module where the real time processing does not keep abreast of the data input. The replay module also controls level 3 processors via event flags.

The level 2 replay module is also loaded by the LTOS to receive test requirements and operating speed information. The module is triggered by the LTOS module to start playback of a previous test. The replay module loads frames of data onto buffers and triggers level 3 tasks. Upon completion of the replay module tasks the module also sets a done flag for the LTOS to indicate that the replay function is complete.

The level 3 tasks include all real time processing tasks. The level 3 module. processes the data received from the support electronics to effect such processes as the construction of a histogram, XY plotting, mapping, sum square, difference, threshold, M of N filtering, etc. Level 3 modules are loaded by the LTOS from which they also receive the test requirements. The LTOS allocates buffers to the level 3 module, some of which may be shared with level 2, 4 or 5 modules. The processing modules operate on input data and set flags for the level 2 modules when processing is complete. The flags then trigger the next higher level task.

The level 4 modules operate to format the data for output. The modules perform an averaging and other functions on the data stored in the data buffer, and collect statistics for output on assigned output devices. The functions include RMS, Averaging, Comparing, PSD (Power Spectral Density, D* (figure of merrit), Normalize and Trac. As with the other modules the level 4 module shares buffers with other level modules. When the level 4 tasks are complete the module triggers the flag permitting the next higher level tasks to proceed.

Level 5 module functions to regulate output service tasks, such as the output of data generated by the level 4 modules. As with the other modules, level 5 modules are loaded by the LTOS with the test requirements and the configuration of assigned output devices. Buffers are allocated by the LTOS which may be common with other level modules. The level 5 modules may be triggered by the level 3 or level 4 modules to process the assigned data. When processing is complete the level 5 module becomes inactive. The level 5 functions include static plot, spatial mapping, three dimensional mapping, XY output, spatial filtering, and histograms.

The last level module is the level 6 module which performs common hardcopy output tasks, such as hardcopy histogram plot, hardcopy XY plot and hardcopy list. Again this module is loaded by the LTOS with test requirements and buffer allocations. The module typically shares one buffer with each specified task on levels 3, 4 or 5 that request the hardcopy. The module reads hardcopy parameters from the system mailbox and generates the required number of hardcopies.

It is to be understood that the advantage derived by the multi-level program structure implemented in the VAX 47 is that it permits the various tasks to be identified for a particular test, allowing dynamic configuration of the program to meet the requirements associated with a particular test scenario. The particular program portions are modular in implementation and may be incorporated into the processing based upon either a preset test sequence or a recognition of the need for such program portion based on an analysis of output data from the module. For example, jitter and clutter rejection, appropriate temporal and spatial filtering and other rejection criteria to discard false data may be implemented as a consequence of data from the module indicating that noise vibrations, momentary or periodic scene vibrations or focal plane faults are present.

The LTOS module directs configuration of the lower level modules such that only those portions of the level 2 to 6 modules that are needed for a particular test scenario are utilized. The remaining portions become transparent to the programming and do not delay processing by the portions being utilized. This advantage is particularly useful when it is desired to process large amounts of data on a real time basis.

The multi-level program thus operates to link select general function modules in accordance with a desired processing functions. In such a manner only the general function modules that are essential to the desired processing function need be linked. The remaining processing modules form no portion of the instruction set and do not delay the overall operation of the program. The program becomes self-configurable upon defining the sources of data, the processing functions to be formed on that data, the priority sequence of the various processing functions and the desired manner of storing and presenting the process data. The root LTOS program operates to link the general function modules to receive the collected data, process the data, store the data, and display data as designated by relatively simple operation input instructions. An operator may simply indicate the source from which data is to be acquired, the analyzing or processing functions to be performed on the data and the console or other location at which the processed and/or raw data is to be presented or stored, and the LTOS orients the generic function modules to be configured in an efficient manner to implement the operators instructions. Modules run only if there is data for them to run. Modules that, for example, perform unneeded processing functions or communicate process data to non-designated displays or storage devices are excluded from the linking arrangement and the system need not provide sufficient processing time to affect the functions of unlinked modules. All programs on the same level run concurrently. Also the same module may concurrently run multiple programs, each with the same or different parameters. The system is presently configured to operate on 32,000 bits of data at a rate of 327,680 bytes per second. The system provides sufficient parallel processing capacity in order to permit concurrent operation. In the presently preferred embodiment each level can run 31 concurrent programs. Accordingly, the program operates to reduce processing time and thereby facilitate real time processing of large amounts of data.

Where the large amounts of data make the data collecting and data processing functions consume the real time capacity of the program, the different priority levels permit functions such as data display to be deferred in preference to high speed data storage devices which make the data available for display at a later time.

It is to be understood that the particular operations that are performed on the data e.g. the particular operations performed by the general function modules, may be varied without departing from the basic principles of the test configuration program. Thus, for example, the level 3 or level 4 modules may implement a variety of different processing functions other than those described above.

A listing of the program information stored in controller 47is appended to this application as an unpublished appendix A. A brief review of the operational characteristics of the program stored in controller 49 is set forth below to facilitate an understanding of the operation of the program to implement the functions of the laboratory test system. It is to be understood, however, that the specific program listings in appendix A and the descriptive information set forth below are provided by means of example only, and are not intended to represent the only way in which the laboratory test system may be implemented, or that the novel features on the program may be affected.

A general description of the interconnection of the various priority levels of general purpose modules, and the event flags used to facilitate communication between the various levels is as follows:

| EVENT FLAGS |  |
|---|---|
| Level 1 | |
| SEND | LTOS Cluster 2 (16 Triggers from level 1 to level 2) |
| RECEIVE | LTOS Cluster 3 (1 common message from all levels except 6) |
| LEVEL 2 | |
| SEND | LTOS Cluster 3 (1 common message to level 1) ACQ Cluster 2 (Buffer #[Bits 0 + 2], 1 real time trigger [Bit 3], 1 replay trigger [Bit 4], Frame Count [Bits 5–17] |
| RECEIVE | LTOS Cluster 2 (16 Triggers from Level 1) ACQ Cluster 3 (32 Ready from Level 3) |
| LEVEL 3 | |
| SEND | LTOS Cluster 3 (1 common message to Level 1) Real Time Cluster 2 (32 Triggers to Level 4, if required) Hard Copy Cluster 2 (16 Common Busy, 16 Common Triggers to Level 6 if required) ACQ Cluster 3 (32 ready to Level 2) |
| RECEIVE | ACQ Cluster 2 (Buffer # [Bits 0–2], 1 real time trigger [Bit 3], 1 Replay trigger [Bit 4], Frame Count [Bits 5–17] from Level 2) |
| LEVEL 4 | |
| SEND | LTOS Cluster 3 (1 common message to Level 1) Process Cluster 2 (32 triggers to Level 5 if required) Hard Copy Cluster (16 common busy, 16 common triggers to Level 6 if required) |
| RECEIVE | Real time Cluster 2 (32 triggers from Level 3) |
| LEVEL 5 | |
| SEND | LTOS Cluster 3 (1 common message to level 1) Hard Copy Cluster 2 (16 common busy, 16 common triggers to Level 6 if required) |
| RECEIVE | Process Cluster 2 (32 triggers from Level 4) |
| LEVEL 6 | |
| SEND | Hard Copy 3 (16 common trigger to levels 3, 4, or 5) |
| RECEIVE | Hard Copy 2 (16 common busy, 16 common triggers from Levels 3, 4 or 5) |

In the presently preferred embodiment the LTOS loads the following parameters to the various modules:

| | |
|---|---|
| Parent process MSX name | 10 char |
| Event flag clutter to use | 10 char |
| Global memory name | 10 char |
| Array size | 1 integer |
| Frames in test | 1 integer |
| Name label for output tasks | 40 char |
| Data scaling factor | 1 F.P. |
| Number of output processors required | 1 char |
| Name of first output process | 10 char |
| Name of mailbox for first process | 10 char |
| Label 1 for first process | 20 char |
| Label 2 for first process | 20 char |
| Qualifier word for first process | 1 integer |
| Name of second output process | 10 char |
| Name of mailbox for second process | 10 char |
| Label 1 for second process | 20 char |
| Label 2 for second process | 20 char |
| Qualifier for second process | 1 integer |
| Name of third process . . . n qualifier for last process. | |

The following pseudo services are affected by the LTOS in response to a particular scenario selected:
1. create buffer (logical name, size) [size is in bytes]
2. get buffer (logical name) [returns a pointer to buffer or zero if not avail]

3. create cluster (logical- name, cluster number) [cluster number is either 2 or 3]
4. get cluster (logical name, cluster number)
5. set flag (cluster number, logical bit) [logical bit is 1-31]
6. release cluster (cluster name)
7. release buffer (logical name)
8. Clear flag (cluster number, logical bit)
9. Read cluster (cluster number)
10. Wait for (cluster number)
11. Wait for and (cluster number)
12. Wait for or (cluster number)

The description below illustrates the particular sequence in which the certain particular modules are implemented in the presently preferred embodiment. The exact implementation is set forth in the appended program listing.

The main driver for the operation of a system may be a simple personal computer which configures the VAX computer to implement the test scenario. As described above, in the presently preferred embodiment the main driver is implemented in a Macintosh Apple Computer. The principal routines affected by the personal computer are described below.

Main driver program:
1. Call routine to get order from VAX on GPIB and put it into accumulator.
2. See if order is to relay another order to the OSTG.
3. If it is, go to subroutine to relay VAX order.
4. See if order is to read data from an SOTG unit and store it into memory.
5. If it is, go to subrountine to read OSTG unit.
6. See if order is to write stored data in memory out to the VAX
7. If it is, go to subroutine that dumps memory contents out to the VAX
8. If order was none of the above, it is an unrecognized command and should be ignored in this case, start over from step 1.

Relay Order Routine
1. Call routine to get order type from VAX on GPIB and put it into accumulator.
2. See if order type is for a three-byte (P3 outdip) instruction.
3. If it is, jump to branch that handles the three-byte case. (A)
4. Since we otherwise have a one-byte (p7 outdip) instruction call routine to get byte from VAX on GPIB and put it into a register
5. If order involves stepping a scene stepper ONLY, jump to B below
6. If order involves resetting the all commands done flag, jump to C below.
7. Otherwise, just present instruction byte to p7 outdip
8. Go back to 1. in main driver routine.

A.
1. Call routine to get low byte from VAX and put it into the lower half of a register.
2. Call routine to get high byte from VAX and put it into the upper half of a register.
3. Present low byte to P3 outdip.
4. Present order to P2 outdip.
5. Delay enough time for CMD not done yet ,flag to assert.
6. Now watch flag until it deasserts.
7. When it does, present high byte to P3 outdip.
8. Present a no CMD command to P2 outdip.
9. Delay if necessary for CMD not done yet flag to assert.
10. Now wait for flag to deassert.
11. Then present order again to P2 outdip.
12. Delay again for CMD not done yet flag assertion
13. Wait for flag deassertion.
14. Jump back to 1. in main driver routine.

B.
1. Invert the X and Y step trigger bits.
2. Present the byte to P7 outdip.
3. Let it dwell there for about 1/100 second.
4. If the X step trigger bit .is low, invert it.
5. If the Y step trigger bit is low, invert it.
6. Present the byte to P7 outdip again.
7. Jump back to 1. in main driver routine.

C.
1. Store bits 0–3 in a holding register.
2. Put all 1's in bits 0–3 in scene byte.
3. Invert the reset CMD done* bit.
4. Present byte to P7 outdip.
5. Let it dwell there for a time period.
6. Invert the reset CMD done* bit again.
7. Present the byte to P7 outdip again.
8. Restore bits 0–3 of the byte to their original values.
9. Jump to B above.

Store OSTG data
1. Reset all counters and pointers.
2. Call routine to reset CMD done flag.
3. Send a global no CMD command via P2 outdip.
4. Wait for the not done yet flag in P4 indip to assert.
5. Now wait for it to disassert.
6. Monitor frame sync through its I/0 port and wait for it to go low if it is high.
7. Wait for frame sync to go from low to high.
8. Send a command to update position readout to card 1 (if first time through loop) via P2 outdip.
9. Wait for the card 1CMD running flag in p4 indip to assert.
10. Now wait for it to disassert.
11. Read lowbyte of data from PO indip and put into a register.
12. Read highbyte of data from P1 indip and put into a register.
13. Increment memory pointer and place lowbyte into memory.
14. Increment memory pointer and place highbyte into memory.
15. Send a no CMD command to card 1 (if first time through loop).
16. Wait for the card 1CMD running flag in p4 indip to assert.
17. Now wait for it to disassert.
18. Jump back to 8. and do loop 5 more times, each time with a different card ID (6 total).
19. Read byte of data from P6 indip and put it into a register.
20. Read byte of data from P5 indip and put it into a register.
21. Increment memory pointer and place first (P6 in dip) byte into memory.
22. Increment memory pointer and place second (P5 indip) byte into memory.
23. Increment memory pointer and put a byte of 2ERD5 into memory, do this twice.

24. Increment frame pointer
25. Call routine to check for an interrupt order from the VAX through the IEEE 488 interface.
26. If there is an interrupt order (except resume), go to step 29 below.
27. If frame counter=8192 then jump back to main driver step 1.
28. Else jump back to step 2 above.
29. Is interrupt order to abort?
30. If so, jump to main driver step 1.
31. Is interrupt order to suspend?
32. If so, do nothing but continuously call routine to check for an interrupt order from the VAX until it comes.
33. If order is to resume, go to step 27 above.
34. Else jump to step 29 above.

Dump OSTG Data
1. Reset all counters and pointers.
2. Read byte of data from memory into accumulator.
3. Call routine to send it to VAX via the IEEE-488 Interf.
4. Increment memory pointer.
5. Have 128K bytes been sent?
6. If not, jump back to 2 above and do loop again.
7. Else jump back to main driver step 1.

What is claimed is:

1. A process of dynamically configuring a set of instructions executed by a computer to permit the computer to implement processing functions defined by an operator, the process comprising:

providing in the computer a library of general function modules ordered by a programmer in predetermined processing priority levels;

linking within the computer only those general function modules necessary for linked modules to implement the defined processing functions, said linking being performed sequentially between modules on the same level, and between modules on different levels, by an operating system independent of operator intervention other than providing the defined processing functions;

communicating test data from external devices to the linked functional modules to implement processing of the test data in accordance with the processing functions by the linked modules, all modules on the same level being run concurrently via parallel processing; and communicating outputs from the linked functional modules to buffers connected to select data presentation devices.

2. The process as recited in claim 1 wherein the step of linking includes the operating system prioritizing data collection, data processing and data presentation respectively, in response to the defined processing functions.

3. The process as recited in claim 1 wherein the step of linking general function modules is affected by a root program in response to input instructions indicating the defined processing functions.

4. The process as recited in claim 1 wherein the step of linking the general functions modules is affected by linking modules operative to perform generic functions in such a sequence so as to implement the defined processing function.

5. The process as recited in claim 1 wherein the general function modules are linkable to exclude modules that perform functions unnecessary to the defined processing function.

6. The process as recited in claim 1 wherein the general function modules are linkable to effect data collection, data processing and data display.

* * * * *